Feb. 14, 1939.   W. RAHR   2,147,457
TOASTER
Filed May 19, 1937
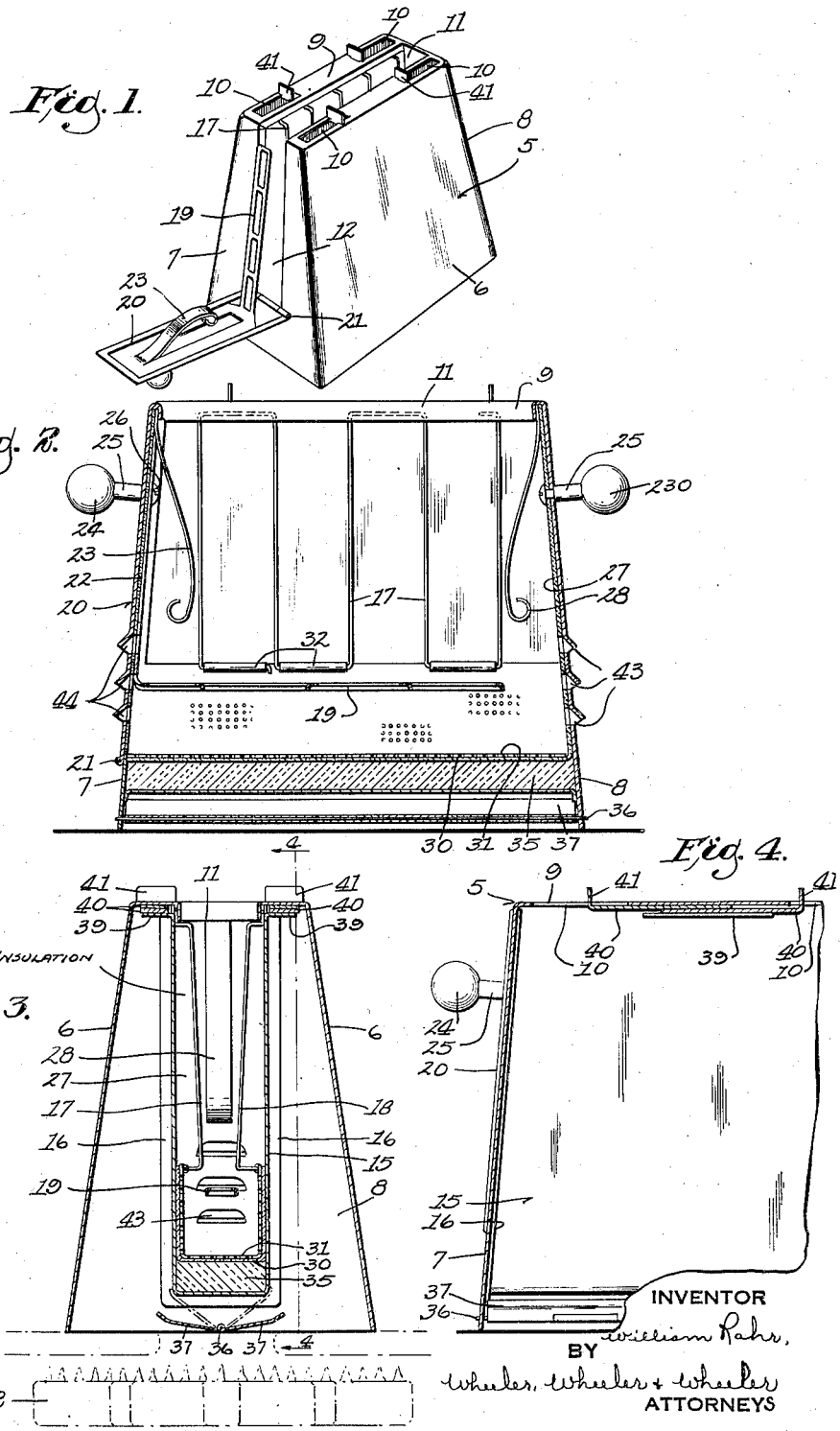
INVENTOR
William Rahr,
BY
Wheeler, Wheeler & Wheeler
ATTORNEYS Patented Feb. 14, 1939

2,147,457

UNITED STATES PATENT OFFICE 2,147,457

TOASTER

William Rahr, Manitowoc, Wis., assignor to Carlier & Rahr, Inc., Manitowoc, Wis., a corporation of Wisconsin Application May 19, 1937, Serial No. 143,405

17 Claims. (Cl. 53—5)

This invention relates to improvements in toasters.

It is the primary object of the invention to produce a toaster which can be used over the open flame or burner of a gas or oil stove or any other source of heat and which, without oxidizing the metal of which it is constructed, will effect the controlled conversion of convective heat to radiant heat to produce results even more satisfactory than those of the conventional electric toaster in the way of speedy uniform production of any desired type of toast without danger to the operator and without exposing the food to products of combustion.

The objectives of this invention will appear in more detail from the following disclosure.

In the drawing:

Figure 1 is a view in perspective of a toaster embodying this invention with the work receiving carriage in its open position.

Figure 2 is an enlarged detail view of the toaster in longitudinal section with the work receiving carriage in its operative position.

Figure 3 is a view on the scale of Fig. 2 showing a transverse section through the toaster.

Figure 4 is a view taken in section on the line 4—4 of Fig. 3.

Like parts are identified by the same reference characters throughout the several views.

The exterior housing 5 of my improved toaster is made of sheet metal in frusto-pyramidal form. Its sides 6 are upwardly convergent as shown in Fig. 3, this being an important item in the controlled distribution of heat. Its front surface 7 and its back surface 8 may likewise be upwardly convergent if desired, this being less important. Its top wall 9 is provided near its corners with vent openings 10 and has a central longitudinal slot at 11 which is continued at 12 down the front wall 7 of the housing to a point near the bottom thereof.

Suspended within the housing 5 is an inner shell at 15 registering with the slots 11 and 12 and comprising a work receiving compartment. The inner shell 15 is supported by means of the end flanges 16 which are spot welded or otherwise conveniently secured to the front and rear walls 7 and 8 of the housing 5. The side faces of the inner shell 15 constitute the radiant surfaces from which heat radiates to toast bread supported midway between these surfaces. Wire guides are provided at 17 and 18 for maintaining the bread approximately centered within the shell 15, the bread being supported on the skeleton base 19 of the carriage 20. The carriage is preferably in the form of a door or face plate pivoted at 21 to the front wall of the housing and preferably provided with insulation at 22 and with a spacer 23 which maintains the bread free of the face plate or door. The door is readily manipulated by a knob of wood 24 or other thermally nonconductive material which is supported at a distance from the door by the spacer 25 and an interior bolt of which the head appears at 26.

A similar knob 230 is supported by like means from the rear wall 8 of the housing, the two knobs together serving conveniently to transport the toaster. The rear wall may also preferably be provided with a sheet of asbestos or other like insulation at 27 and with a spring 28 which is identical to spring 23 and serves to keep the bread away from the wall.

The asbestos used for insulation of the walls may be continued across the bottom of the bread receiving portion of shell 15 as indicated at 30. It is covered with a piece of very light weight foraminous metal at 31 in the shape of a deep channel, the upper margin of which is provided with ears at 32 for positioning the wire guides 17 and 18. The skeleton arm portion 19 of the bread receiving carriage is preferably spaced well above the foraminous metal liner 31. The lightness of the liner and the perforations therein are both for the purpose of reducing its radiant characteristics to prevent the bottom margin of the slice of bread from being burned.

Beneath the sheet of asbestos 30 which extends beneath the false bottom provided by liner 31, I prefer to incorporate within the base of shell 15 a layer 35 of substantial thickness of insulation such as mineral wool. This substantially prevents heat conduction through the bottom of the shell.

Across the open bottom of housing 6 from front to rear there is a pintle at 36 upon which are hinged the baffle plates 37 for individual adjustment. These plates are preferably slightly upwardly curved at their free margins. When either plate is folded upwardly to the position shown in dotted lines in Fig. 3, its free margin will approach very closely, if not actually contact, the lower corner of the inner shell 15. In this position it will divert hot gases from the burner 38 so that they will not contact directly the bottom of the shell 15 but will pass very close to the sides of the shell. When the baffle is lowered to a position shown in full lines it will not merely protect the bottom of shell 15 from direct contact by the gases, but will also throw the gases outwardly so that they will tend for the most part to avoid any contact whatever with the radiant sides of shell 15.

The top margins of shell 15 are outwardly flanged at 39 and between these outward flanges and the top 9 of the housing are confined shutters or slides 40 with upwardly turned handles 41 which project through slots 10. The location of the slots 10 at the corners of the housing and the provision of an imperforate or substantially imperforate top surface 9 therebetween, will prevent the heated gases from the burner 38 from merely passing up through the center of the space between the housing and the shell and will ensure the thorough distribution of the heat.

The baffles 37 and the slides 40, together constitute means for adapting the toaster to any burner or source of heat. If the slides 40 are adjusted to completely close the exhaust ports or slots 10, the heat will immediately be concentrated in the bottom of the toaster under ordinary burner conditions. If the slots are wide open the top of the toaster will, under ordinary conditions, be overheated. Therefore for the usual types of burners the slides will be adjusted to intermediate positions and the baffles 37, the purpose of which has already been described, will likewise be adjusted to intermediate positions. By means of the adjustment of the baffles and the slides the device may be made to compensate for all special types of burners so as to produce uniform even toasting over any burner.

Reference has already been made to the fact that the sides 6 of the outer housing are upwardly convergent. I have found this very desirable as a means of equalizing radiation from the top and bottom of the substantially parallel walls of the inner shell 15. It is desired to emphasize the fact that in this device all toasting is done by radiant heat, and the radiant heat is developed entirely from the convection of heat by the products of combustion or other gases arising over the burner. The interior of the shell 15 is completely sealed against penetration of these gases. The length of the toaster is such that it will preferably completely span the burner upon which it is used. It is very desirable that fresh and relatively cool air be admitted to the interior of the shell 15 through the louvers or openings 43 in the back wall 8 and the like openings 44 in the door portion of the carriage which closes the front of the device. The circulation of fresh air throughout the interior of shell 15 further assures that the toasting will be done by radiant heat and that the heating of the metal unavoidably engaged with the bread will not be excessive.

In actual use it has been demonstrated that the crust of a slice of bread will not be heated more than the faces thereof, the whole slice being uniformly toasted to an even color. The toasting may be made to occur with the greatest rapidity so that a slice of toast can be produced in twenty seconds over a hot gas flame. By turning the gas flame down and taking a longer period, the bread may be thoroughly penetrated to produce the so-called "Melba" toast.

I have purposely selected a single slice toaster as a means of exemplifying the invention, but I do not limit the claims to such a toaster. Various changes can be made in the mechanical construction of the device within the scope of the present invention which I believe to be the first instance in which the heat from a horizontal burner or source is applied through convection currents for the radiant toasting of both sides of a piece of bread simultaneously while protecting the bread from direct contact with products of combustion.

It will be noted that in the device illustrated the inner shell or receptacle which receives the toast, really comprises a partition subdividing the outer housing to provide two separate conduits for convection currents. These conduits are individual to the toasting plates which comprise the side walls of the inner shell. The controlled flow of convection currents through the conduits adjacent these plates delivers to the plates the heat which they, in turn, radiate to the bread for the toasting thereof.

It is to be understood that the sides 15 of the toast receptacle, such sides constituting the radiant plates by means of which the bread is toasted, may in some variants of the device deviate from parallelism. If it is desired that these plates have a position other than parallel, it is only necessary to change the form of the housing 6 or the baffles therein in such a way as to increase the amount of heat delivered either by the convection currents or by reflection from the inner walls of the housing to those portions of the plates which are farthest from the bread to be toasted. The increased distance between any portion of the plate and the bread will result in a decreased delivery of radiant heat to the bread unless the more distant portion of the plate is rendered hotter. Excess heat may be delivered where desired by changing the shape of the housing or providing additional baffles therein, or by adjusting the ports which control the flow of convection currents therethrough.

I claim:

1. In a toaster for cooperation wtih a source of heat therebeneath, the combination with a receptacle having side walls and a bottom, a means for removably supporting food above said bottom and between said walls, of a housing including sides laterally adjacent said receptacle in spaced relation to the sides of the receptacle upwardly convergent toward the receptacle and comprising means for directing and reflecting heat to the receptacle sides, said housing being open at its bottom to receive heat from said source and having adjustable openings in its top adjacent said receptacle walls for permitting the controlled escape of convection currents.

2. In a toaster for use over a source of heat therebeneath, the combination with a food receiving receptacle having closely spaced and substantially parallel side walls for the radiation of heat to food therebetween, and a housing open at its bottom and provided with sides upwardly convergent toward the side walls of said receptacle between the bottom and the top of said receptacle for directing heat thereagainst, said housing having adjustable openings at its top for the controlled escape of convection currents from said source.

3. In a toaster of the character described, the combination with a support for a slice of bread, of a pair of plates disposed in spaced relation at opposite sides of the support, guard means centering the slice of bread on said support between said plates, and housing means providing convection conduits open at their bottom and extending upwardly along each of said plates, said conduits having means for individually controlling the flow of convection currents therethrough in proximity to said plates.

4. In a toaster of the class described, the combination with a pair of spaced plates for the delivery of radiant heat in the toasting of a slice of bread therebetween, of a movable support for a slice of bread upon which said bread is movable to and from position between said plates, and housing means providing conduits individual to the respective plates for the heating thereof by convection currents, said housing being open at its bottom to receive said currents from a source of heat therebeneath and said housing being provided at its top with outlets for said conduits immediately adjacent said plates and toward which the sides of the housing converge from the level of the bottom of said receptacle and means for controlling the sizes of the respective outlets, whereby to regulate the flow of convection currents through said conduits.

5. In a toaster of the class described, the combination with a bread receiving receptacle having heat radiating walls spaced to toast a slice of bread therebetween, said walls being substantially imperforate and said receptacle being provided with means communicating directly with the atmosphere for the circulation of air past the bread during the toasting thereof, and housing means providing conduits individual to the respective walls of said receptacle and open to receive convection currents from the source of heat therebeneath, whereby to confine said currents against said walls for the heating thereof without penetration into said receptacle.

6. In a toaster of the class described, the combination with a toast receiving receptacle and a work carrier upon which bread is movable into said receptacle, said receptacle having spaced walls between which said bread is positioned in the final movement of the carrier, means for insulating said receptacle from the radiation of a source of heat therebeneath, means for protecting the contents of said carrier from contact with convection currents from said source, and means for directing such currents along the sides of the receptacle to deliver heat thereto for rendering said sides radiant in the toasting of the work on said carrier.

7. In a toaster of the class described, the combination with a receptacle having substantially parallel walls and a closed bottom, of a bread receiving carriage having a bread support movable to and from a position in which said support is disposed between said walls at a point spaced above said bottom, and housing means open at its bottom and including sides upwardly converging toward the walls of said receptacle substantially continuously throughout the height of the bread-receiving portion of said receptacle and in heat confining relation to the walls of said receptacle, said housing having means at its top for the escape of convection currents rising through the open bottom of said housing from a source therebeneath.

8. In a toaster of the class described, the combination with a housing comprising side walls, a back wall and slotted front and top walls, said housing being open at its bottom, of plates extending in spaced relation between the back wall and the front wall of the housing at either side of the slot of the front wall and in spaced relation to the sides of the housing, whereby to define convection conduits for the heating of said plates from a source beneath said housing, means excluding said currents from the space between the plates, and a carrier movable into and from said space, said housing being vented at its top for the escape of convection currents from said conduits, and said housing being vented at its rear for the admission of air substantially free of said currents to the space between said plates.

9. In a toaster of the class described, the combination with a housing open at its bottom and provided with wall means, of toasting plates extending in spaced relation across said housing and connected by a bottom wall to provide a work receiving chamber within said housing, means insulating said bottom wall against delivery of heat to said chamber from a source beneath said housing, a support upon which bread is movable to a position between said plates, and means for controlling convection currents rising from said source through said housing, whereby to regulate the delivery of heat therefrom to said plates.

10. In a toaster of the class described, the combination with a pair of spaced plates providing a narrow chamber elongated in form to receive a single slice of bread with its faces presented to said plates, a housing having wall means defining conduits individual to the respective plates open at their bottoms and of upwardly decreasing cross section past said plates, said housing being provided with top vents for the respective conduits, insulating means below a bread receiving space between said plates, and a bread support above said insulating means.

11. In a toaster of the class described, the combination with a pair of spaced plates, a housing having wall means defining conduits individual to the respective plates open at their bottoms and of upwardly decreasing cross section, said housing being provided with top vents for the respective conduits, insulating means below a bread receiving space between said plates, and a bread support above said insulating means, said housing having baffle means adjustable with reference to each of said plates for directing the flow of convection currents past the respective plates.

12. A toaster of the class described comprising the combination with an inner receptacle having a bottom and sides comprising toasting plates, of housing means enclosing said sides and providing convection current conduits individual to the respective plates, said housing being open at its bottom and provided at its top with vent means for said conduits, of a door for the front of the space between said plates, a toast carrier mounted on the door and arranged to lie between said plates and above said bottom, said door being movable to withdraw toast on said carrier from between said plates, and the space between said plates being open in an upward direction, said housing and door having vents communicating therewith for permitting the free circulation of air therethrough independently of the convection currents in said housing.

13. In a toaster of the class described, the combination with a pair of spaced toasting plates, of housing means enclosing said plates and providing conduits individual thereto open at their bottom to receive convection currents from a source of heat beneath said plates, insulating means closing the bottom of the space between said plates, a support underlying said insulating means, baffles pivoted upon the support and individually adjustable with reference to the respective plates for controlling the flow of convection currents through said conduits for the controlled heating of said plates, and slides mounted on said housing means for the control of the escape of convection currents from said conduits, said housing means being vented to permit such escape subject to the manipulation of the slides.

14. In a toaster of the class described, the combination with a housing open at its bottom and vented at its top, of a receptacle closed against communication with said housing and disposed therewithin in spaced relation to the sides of said housing and in a position whereby said receptacle will be exposed at its sides to convection currents passing through the housing between the open bottom and the vented top thereof, said receptacle having means communicating directly with the atmosphere for permitting the circulation of fresh air through the receptacle independently of convection currents in said housing.

15. In a toaster of the class described, the combination with a housing open at its bottom and vented at its top and comprising side walls converging upwardly toward the vents in the top thereof, the top vents of said housing being spaced adjacent its opposite sides, of a receptacle disposed centrally within said housing and having side wall portions and a closed bottom connecting said portions, the side wall portions being spaced to receive a slice of bread and of such dimensions and proximity as to be in close relation to the opposing faces of the bread, each of the side wall portions of the receptacle being immediately adjacent the top openings of the housing, whereby to be directly exposed to convection currents moving upwardly in the housing between the bottom opening and the top vents thereof and subject to heat derived from said convection currents and from reflection from the walls of the housing convergent thereto, the convergence of the housing walls to the receptacle wall portions being substantially continuous and approximately uniform throughout the height of the receptacle, whereby the heat radiated to bread within the receptacle will be substantially uniform.

16. The combination with a housing open at its bottom and vented at its top, of a receptacle having side and bottom wall portions closed against communication with the interior of said housing, said receptacle wall portions being provided with means connecting said receptacle with the top of said housing and through which said housing is vented, said receptacle opening upwardly to be accessible from a point above said housing, said housing having side portions converging substantially continuously toward the side wall portions of said housing in an upward direction, whereby the cross section of the space between the housing and the receptacle is progressively reduced and the side wall portions of the receptacle are adapted to receive heat substantially uniformly from convection currents passing upwardly from said bottom to the vent of said housing.

17. In a device of the class described, the combination with a food receptacle having a closed bottom and upwardly extending sides connected with the bottom and opening upwardly, of housing means open below the receptacle and having vented portions connecting the top of the housing means with the top of the receptacle, said housing means having side wall portions substantially closed from its open bottom to its vented portions aforesaid, and substantially continuously and approximately uniformly convergent to the side walls of the receptacle throughout the height thereof, whereby convection currents rising through the open bottom of the housing means toward the vented portions thereof pass through a space of progressively decreasing cross section and deliver heat to the side wall portions of said receptacle with substantial uniformity throughout the height of the receptacle for the uniform cooking of the contents thereof.

WILLIAM RAHR.